US012773820B2

(12) United States Patent
Scott

(10) Patent No.: US 12,773,820 B2
(45) Date of Patent: Oct. 27, 2026

(54) DEVICE AND METHODS FOR FOLDING AND BENDING LAMINATE FLOORING

(71) Applicant: Gregory Scott, Murfreesboro, TN (US)

(72) Inventor: Gregory Scott, Murfreesboro, TN (US)

( * ) Notice: Subject to any disclaimer, the term of this patent is extended or adjusted under 35 U.S.C. 154(b) by 24 days.

(21) Appl. No.: 18/613,059

(22) Filed: Mar. 21, 2024

(65) Prior Publication Data

US 2024/0326314 A1 Oct. 3, 2024

Related U.S. Application Data

(60) Provisional application No. 63/456,024, filed on Mar. 31, 2023.

(51) Int. Cl.
*B29C 53/04* (2006.01)
*B29C 53/80* (2006.01)
*B29L 31/00* (2006.01)

(52) U.S. Cl.
CPC ............ *B29C 53/043* (2013.01); *B29C 53/80* (2013.01); *B29L 2031/732* (2013.01)

(58) Field of Classification Search
CPC .................................................... B29C 53/043
See application file for complete search history.

(56) References Cited

U.S. PATENT DOCUMENTS

| | | |
|---|---|---|
| 1,872,482 A | 8/1932 | Messing |
| 2,937,689 A | 5/1960 | Peterson |
| 3,028,628 A | 4/1962 | Rutherford |
| 4,058,942 A | 11/1977 | Naka |
| 4,060,947 A | 12/1977 | Naka |
| 4,077,825 A | 3/1978 | Naka |
| 4,093,499 A | 6/1978 | Naka |
| 4,151,320 A | 4/1979 | Naka |

(Continued)

FOREIGN PATENT DOCUMENTS

| | | |
|---|---|---|
| CN | 112776090 A | 5/2021 |
| CN | 215619919 | 5/2021 |

(Continued)

OTHER PUBLICATIONS

PCT/US24/22441, International Search Report and Written Opinion, Jul. 19, 2024, 12 pages.

*Primary Examiner* — Virak Nguon
(74) *Attorney, Agent, or Firm* — WaddeyAcheson; Ira C. Waddey, Jr.

(57) ABSTRACT

An automated flooring system includes a square-nose device and a bull-nose device for forming square-nose and bull-nose configurations, respectively. The square-nose device features a frame with a forming panel comprising three forming plates rotatably coupled to each other to receive and accommodate a planar flooring. A plurality of actuators facilitate transverse rotation of sections of the flooring to achieve the square-nose profile. The bull-nose device comprises a frame, a rotor plate, rollers, and a clamp bar, with actuators for engaging and forming the flooring into a bull-nose configuration. A de-slacker presents flooring the devices, while a conveyor system transports flooring through stations for cutting grooves, applying adhesive, and heating before discharge. The system streamlines the production of square-nose and bull-nose flooring configurations, enhancing efficiency in flooring manufacturing processes.

6 Claims, 18 Drawing Sheets

(56) References Cited

U.S. PATENT DOCUMENTS

| | | | |
|---|---|---|---|
| 4,557,684 A | 12/1985 | Romine et al. | |
| 10,065,404 B2 | 9/2018 | Neill et al. | |
| 11,332,941 B2 | 5/2022 | Bodendorf et al. | |
| 11,485,166 B2 | 11/2022 | Mendez et al. | |
| 11,572,695 B2 | 2/2023 | Alkhafaji | |
| 2011/0146168 A1 | 6/2011 | van Genderen | |
| 2013/0305635 A1 | 11/2013 | McCool et al. | |
| 2021/0010272 A1* | 1/2021 | Bodendorf | B29C 70/682 |
| 2021/0154990 A1 | 5/2021 | Naeyaert | |
| 2021/0381244 A1 | 12/2021 | Iannacone, III | |
| 2022/0205248 A1* | 6/2022 | Alkhafaji | E04F 15/02038 |
| 2022/0213690 A1 | 7/2022 | Iannacone, III | |
| 2022/0235557 A1 | 7/2022 | Bodendorf et al. | |
| 2022/0250304 A1* | 8/2022 | Dipaula | B29C 53/84 |
| 2022/0363026 A1 | 11/2022 | van Rees | |
| 2022/0381038 A1 | 12/2022 | Bremer et al. | |
| 2023/0020659 A1 | 1/2023 | Iannacone, III | |

FOREIGN PATENT DOCUMENTS

| | | | |
|---|---|---|---|
| CN | 218374825 | 1/2023 | |
| FR | 1210455 | 3/1960 | |
| FR | 1210455 A * | 3/1960 | B65D 9/30 |
| JP | 11129031 | 5/1999 | |
| JP | H11129031 A * | 5/1999 | |

* cited by examiner

DEVICE AND METHODS FOR FOLDING AND BENDING LAMINATE FLOORING

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a non-provisional of U.S. Patent Application No. 63/456,024 filed Mar. 31, 2023 entitled DEVICE AND METHODS FOR MAKING LAMINATE FLOORING, which is hereby incorporated by reference in its entireties.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

FIELD OF THE INVENTION

The present invention relates generally to laminate flooring and more particularly to devices to fold a flooring into a square-nosed configuration and bend the flooring into a bull-nose configuration.

BACKGROUND

The present disclosure relates generally to devices and methods for forming laminate flooring, and more particularly to forming molded stair treads, such as square-nose and bull-nose.

Laminate flooring is often used in a variety of uses in residential and light commercial settings. Laminate flooring provides a good balance between affordability, durability, and aesthetics. Square-nose (e.g., right-angled) and bull-nose (e.g., curved) configurations are sometimes used for laminate flooring. Both the configurations create a clean and finished look at the plank edges, especially when transitioning between the flooring and other surfaces like walls, baseboards, or doorways.

Conventional systems for forming laminate flooring into the square-nose and bull-nosed configurations for molded stair treads require a substantially flat piece of flooring being manipulated to be formed into a proper square-nose or bull-nose configuration. Such manipulation typically requires various manual steps to form the flooring into the proper configuration. Such manual steps present problems such as cost, time, and inconsistencies in the floorings prepared for multiple stair treads. Such manual methods are difficult to scale up in commercial productions as well. It would be advantageous to provide an automated system that obviates the need for such manual steps. Therefore, there is a long felt need in the art for a device for laminate flooring for achieving square-nose and bull-nose configurations. What is needed are improvements in devices and methods for forming laminate flooring.

It is one prospect of the present invention to provide a novel device for forming a laminate flooring wherein the device is of simple but effective construction for convenient, automatic, and efficient folding and bending of a laminate flooring.

SUMMARY OF THE INVENTION

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In the preferred embodiment, a device for forming square-nose flooring is disclosed. The device comprises a frame for providing stability and support to the device. A forming panel is disposed and operatively connected to the frame, the forming panel includes a first forming plate, a second forming plate, and a third forming plate. The first forming plate is rotatably coupled to the second forming plate using a first plate joint. The first plate joint is disposed between the first forming plate and the second forming plate. The second forming plate is rotatably coupled to the third forming plate using a second plate joint wherein the second plate joint is disposed between the second forming plate and the third forming plate. The forming plate is sized and configured to receive and accommodate a planar flooring thereon. The first forming plate supports a first section of the flooring, the second forming plate, which can accommodate a radius plate. supports a second section of the flooring and the third forming plate supports a third section of the flooring. A clamping device, which also can accommodate a radius plate, is included that has a clamp bar disposed on the frame for supporting the flooring. A first actuator is operatively connected to the first plate joint to rotate the first forming panel about the first plate joint to transversely rotate the first section of the flooring relative to the second section of the flooring. A second actuator is operatively connected to the second plate joint to rotate the third forming panel about the second plate joint to transversely rotate the third section of the flooring relative to the second section of the flooring. A third actuator is configured to rotate the clamp bar, such that the clamp bar engages the second forming plate.

In one aspect, an automated square-nose system for forming square-nose configurations in flooring is disclosed. The square-nose device comprises a frame, a forming panel, the forming panel includes a first forming plate, a second forming plate, and a third forming plate. A first actuator is operatively connected to a first plate joint to rotate the first forming panel about the first plate joint to transversely rotate a first section of the flooring relative to a second section of the flooring. A second actuator is operatively connected to a second plate joint to rotate a third forming panel about the second plate joint to transversely rotate a third section of the flooring relative to the second section of the flooring. A de-stacker is configured to retrieve flooring from a stack, a router station is configured to cut grooves into the surface of the flooring, a heater/glue station is configured to apply adhesive to the grooves and heat the flooring, and a conveyor system is configured to move the flooring through the router station and the heater station.

One aspect of the present disclosure is a square-nose device configured to receive a piece of laminate flooring and fold the flooring into a square-nosed configuration. The square-nose device may be configured to secure a portion of the flooring to a panel, and fold the remaining portions of the flooring relative to the secured portion in order to form the flooring into a square-nose configuration.

Another aspect of the present disclosure is an automated square-nose system, which may include the square-nose device. The automated square-nosed system may include a de-stacker, a router station, a heater/glue station, and the square-nose device. A piece of laminate flooring may be moved through the automated square-nose system in order to cut grooves into the flooring, heat the flooring, apply an adhesive to the grooves, and provide the flooring to the square-nose device for forming the flooring into a square-nose configuration.

Another aspect of the present disclosure is a bull-nose device configured to receive a piece of laminate flooring and bend the flooring into a bull-nose configuration. The bull-nose device may be configured to secure the flooring to a rotor plate and in between a pair of rollers. The rotor plate may be configured to rotate relative to the pair of rollers, thereby bending the flooring into the bull-nose configuration.

Yet another aspect of the present disclosure is an automated bull-nose system, which may include the bull-nose device. The automated bull-nose system may include a de-stacker, a conveyer system, a heater oven, and the bull-nose device. A piece of flooring may be moved through the automated bull-nose system in order to heat the flooring and provide the flooring to the bull-nose device for forming the flooring into a bull-nose configuration.

In another aspect, an automated bull-nose system for forming bull-nose configurations in flooring is disclosed. The system includes a de-stacker, a heater, a conveying system, and a bull-nose forming device, the device comprises a frame, a rotor plate disposed on and operatively connected to the frame, the rotor plate is configured to receive a piece of flooring and secure it in position, a first roller and a second roller are positioned adjacent to the rotor plate, the first roller and the second roller configured to hold one end of a portion of the flooring therebetween, a clamp bar is disposed on the frame, a first actuator is operatively connected to the clamp bar and configured to actuate the clamp bar to engage the flooring, a second actuator is operatively connected to the rotor plate and configured to rotate the rotor plate to form a bull-nose configuration in the flooring, a swing arm and an ejector device is configured to un-bow and discharge the flooring from the bull-nose device, a de-stacker is configured to present laminate flooring to the heater, a conveyor system is configured to move the laminated flooring through a heating station before presentinh it to the automated bull-nose system.

Numerous other objects, advantages and features of the present disclosure will be readily apparent to those of skill in the art upon a review of the following drawings and description of a preferred embodiment.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

DETAILED DESCRIPTION

Figure 1:
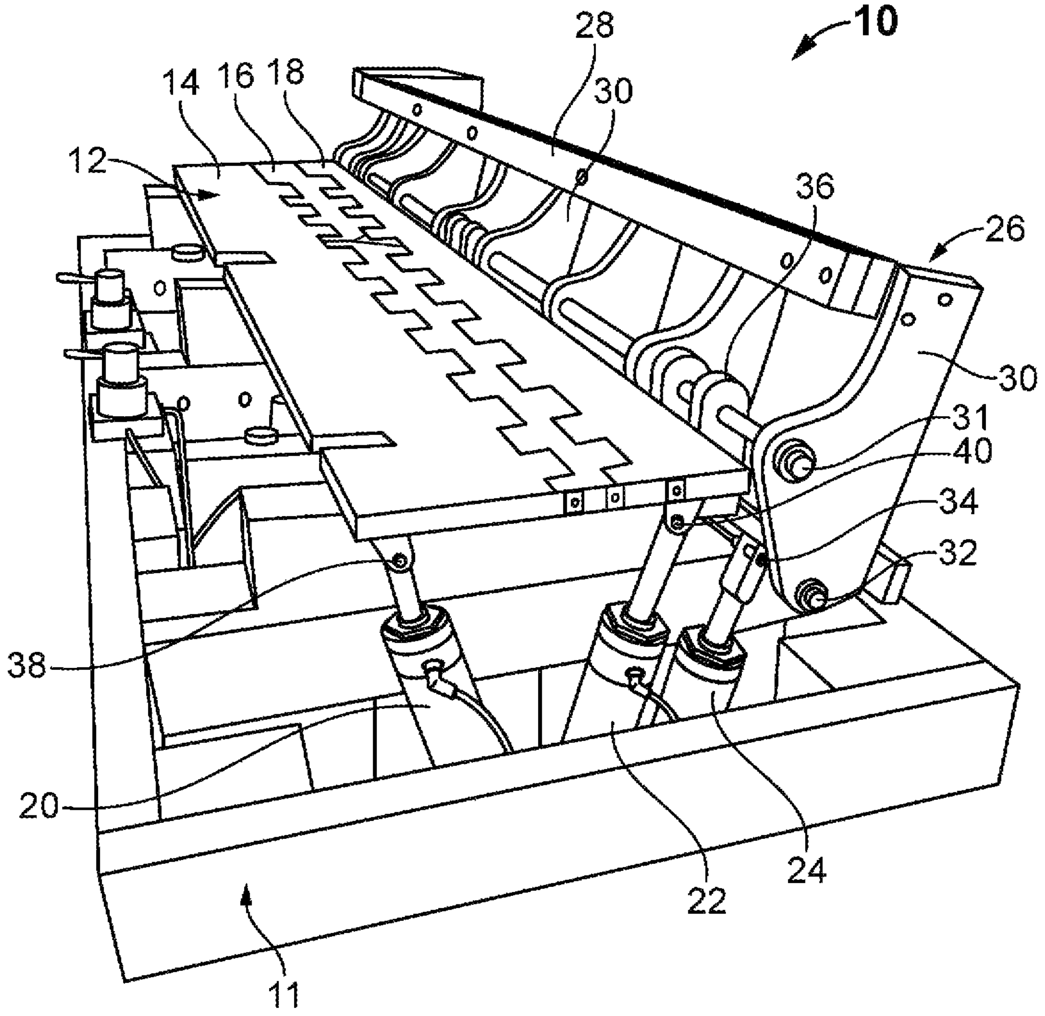
FIG. 1 is a side perspective view of an embodiment of a device for forming laminate flooring into a square-nose configuration in accordance with the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing, or as otherwise described. A person of skill in the art will recognize that the apparatus can assume different orientations when in use.

Reference will now be made in detail to the present preferred embodiments of the invention, examples of which are illustrated in the accompanying drawings. Wherever possible, the same reference numerals are used in the drawings and the description to refer to the same or like parts.

Referring generally to the FIGURES, devices and methods for forming laminate flooring are provided. For example, a square-nose device 10 may be configured to receive a piece of laminate flooring (flooring) 70 in a substantially flat configuration and form (e.g., fold, shape, configure, mold, etc.) the flooring 70 into a square-nose configuration. The square-nose device 10, which may be included in an automated square-nose system 100 for forming the flooring 70 into the square-nose configuration, is discussed with reference to FIGS. 1-11. As another example, a bull-nose device 200 may be configured to receive a flooring 270 in a substantially flat configuration and form the flooring 270 into a bull-nose configuration. The bull-nose device 200, which may be included in an automated bull-nose system 300 for forming the flooring 270 into the bull-nose configuration, is discussed with reference to FIGS. 12-15. Once formed as provided herein, the floorings 70 or 270 may be applied to the surface of a tread, advantageously following the precise contours of a square or curved tread as desired.

Figure 2:
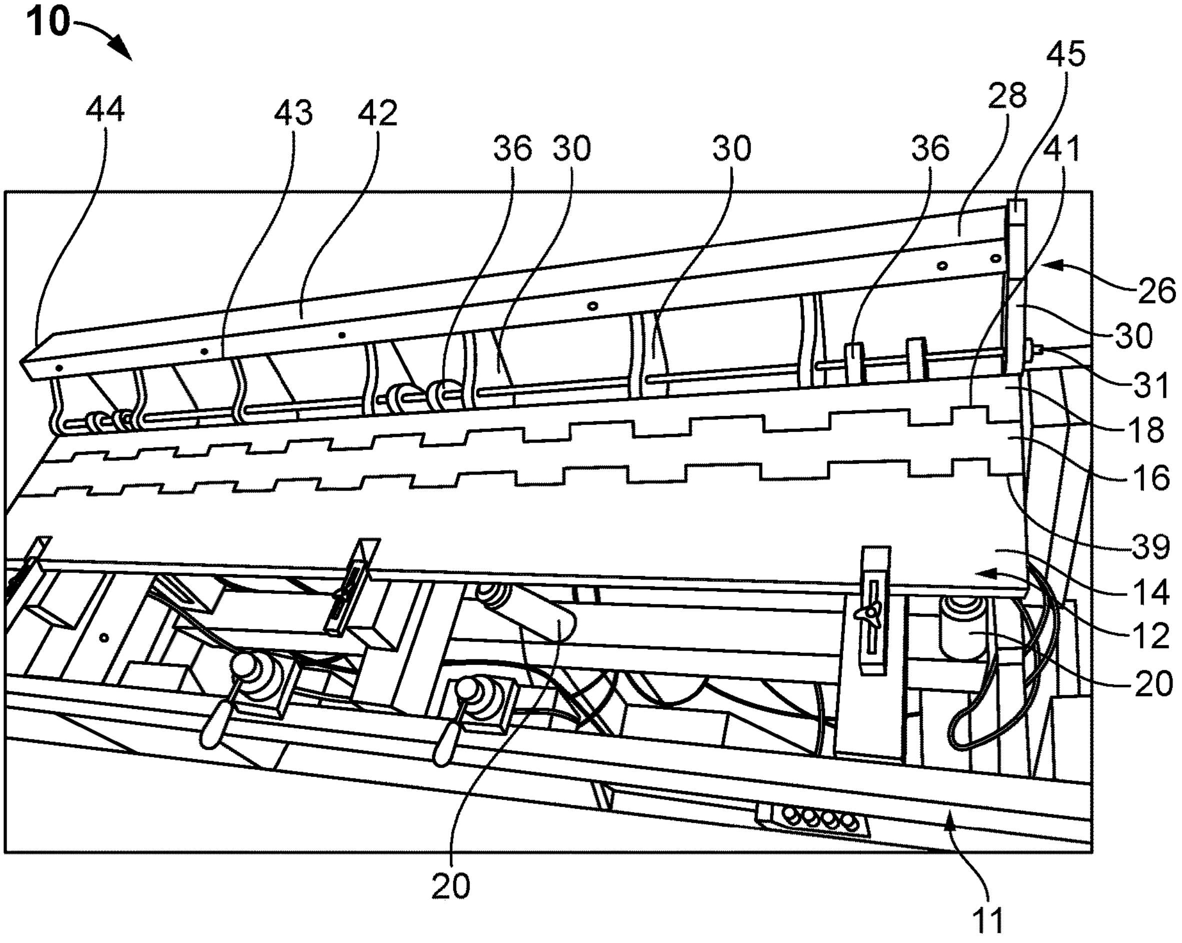
FIG. 2 is a top perspective view of an embodiment of a device for forming laminate flooring into a square-nose configuration in accordance with the present disclosure.
Figure 3:
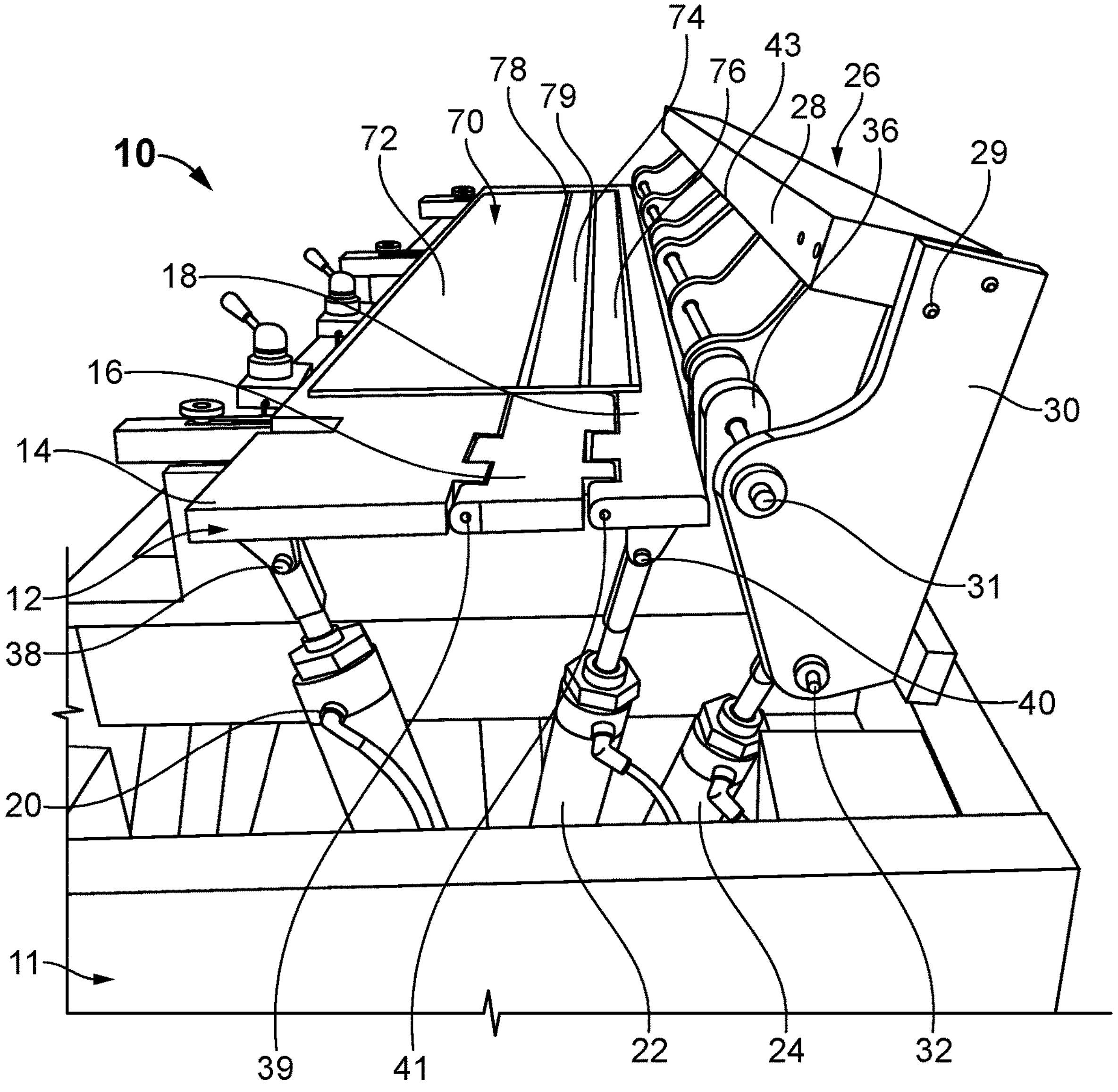
FIG. 3 is a side perspective view of an embodiment of a device for forming laminate flooring into a square-nose configuration with laminate flooring positioned on the device in accordance with the present disclosure.

Referring now to FIGS. 1-2, an exemplary implementation of the square-nose device 10 is shown, according to some embodiments of the present disclosure. The square-nose device 10 may include a first frame 11 that is configured to support one or more of the components of the square-nose device 10. The first frame 11 provides a stable position and support to the square-nose device 10. The square-nose device 10 may further include a forming panel 12 which is operatively connected and disposed on the first frame 11 and which consists of a plurality of forming plates. The forming panel 12 includes a first forming plate 14, a second forming plate 16, and a third forming plate 18. In some embodiments, the first, second, and third forming plates 14, 16, and 18 have pivotable joints located therebetween in order to allow the first, second, and third forming plates 14, 16, and 18 to rotate relative to one another. In the preferred embodiment, the first and second forming plates 14, 16 may be rotatably coupled via a first plate joint 39, and the second and third forming plates 16, 18 may be rotatably coupled via a second plate joint 41 (as best seen in FIG. 3). All the forming plates, 14,16,18 are substantially of same length and the forming plate 16 is positioned between the forming plates 14,18, and can accommodate a radius plate if need be. In some embodiments, the first forming plate 14 and the second forming plate 16 are detachably coupled via the first plate joint 39 and the second forming plate 16 and the third forming plate 18 are detachably coupled via the second plate joint 41.

Referring now to FIG. 3, with additional reference to FIGS. 1-2, a flooring shown through the exemplary planar flooring 70 is placed on the forming panel 12, according to some embodiments of the present disclosure. For example, as described in greater detail below with reference to FIG. 11, the flooring 70 may be placed on the forming panel 12 in order to be formed into a square-nose configuration. The flooring 70 placed on the forming panel 12 may have a first groove 78 and a second groove 79 pre-cut onto the surface of the flooring 70, thereby forming a first section 72, a second section 74, and a third section 76 of the flooring 70. In the preferred embodiment, the flooring 70 may be placed on the forming panel 12 such that the first section 72 is placed on the first forming plate 14, the second section 74 is placed on the second forming plate 16, and the third section 76 is placed on the third forming plate 18. The flooring 70 can have any length up to the length of the forming panel 12.

Figure 4:
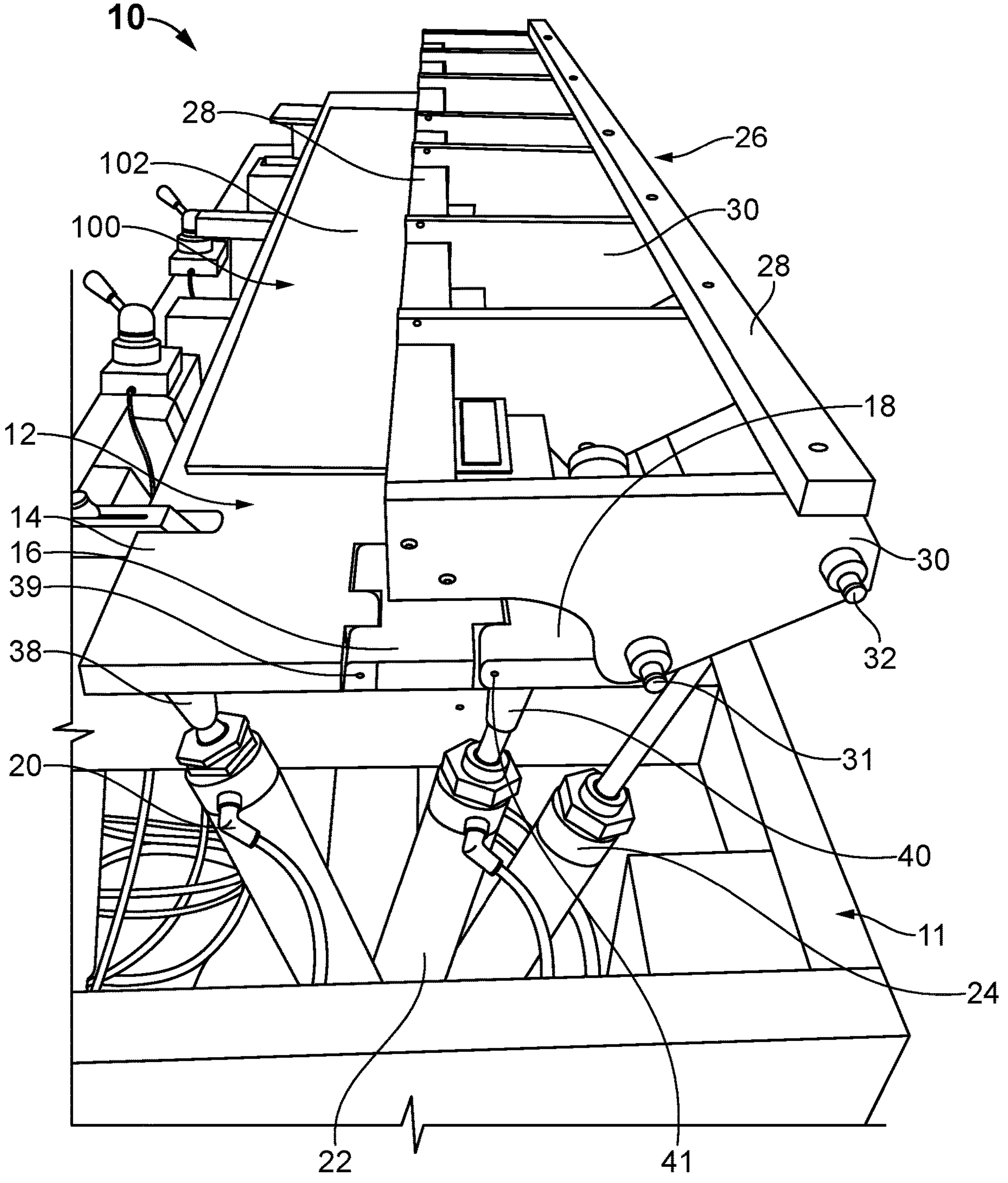
FIG. 4 is a side perspective view of an embodiment of a device for forming laminate flooring into a square-nose configuration performing a step of a formation process in accordance with the present disclosure.

Referring now to FIG. 4, with additional reference to FIGS. 1-3, the flooring 70 is shown secured to the forming panel 12 via a clamping device 26, according to some embodiments of the present disclosure. In particular, once the flooring 70 is placed on the forming panel 12 as shown with reference to FIG. 3, a first clamp bar 28 of the clamp device 26 may be moved to secure the second section 74 of the flooring 70 to the second forming plate 16 of the forming panel 12. For example, the clamp device 26 may include a plurality of swing arms 30, which are each secured to the first clamp bar 28 at one end 29. The plurality of swing arms 30 may be configured to rotate about a pivot bar 31, which may be held in place relative to the first frame 11 via a number of pivot bases 36. Accordingly, the swing arms 30 may be rotated about the pivot bar 31, such that the first clamp bar 28 may be engaged with the flooring 70. In particular, the first clamp bar 28 may be engaged with the second section 74 of the flooring 70, thereby securing the second section 74 to the second forming plate 16. Both clamp bar 28 and second forming plate 16 can accommodate a radius bar clamp if needed in forming various types of flooring.

Referring generally to FIGS. 1-4, the square-nose device 10 may further include a first actuator 20, a second actuator 22, and a third actuator 24. Preferably, the actuators 20,22,24 can be pneumatic actuators. As shown with reference to FIGS. 1 and 10, a plurality of first, second, and third actuators 20, 22, 24 are aligned as shown along the length of the forming panel 12 of the square-nose device 10. As described in greater detail below with reference to FIGS. 1,3 and 4, the first actuator(s) 20 may be operable to rotate the first forming plate 14 relative to the second forming plate 16, the second actuator(s) 22 may be operable to rotate the third forming plate 18 relative to the second forming plate 16, and the third actuator may be operable to rotate the swing arms 30 relative to the forming panel 12 (as described above). Accordingly, the first actuator(s) 20 may be rotatably coupled at actuable end(s) thereon to the first forming plate 14 via first pivot member(s) 38, the second actuator(s) 22 may be rotatably coupled at actuable end(s) thereon to the third forming plate 16 via second pivot member(s) 40, and the third actuator(s) 24 may be rotatably coupled at actuable end(s) thereon to third pivot member(s) 34 on the swing arms 30 via third pivot member(s) 34 coupled to an actuator bar 32 rotatably coupled to each of the swing arms 30.

Figure 5:
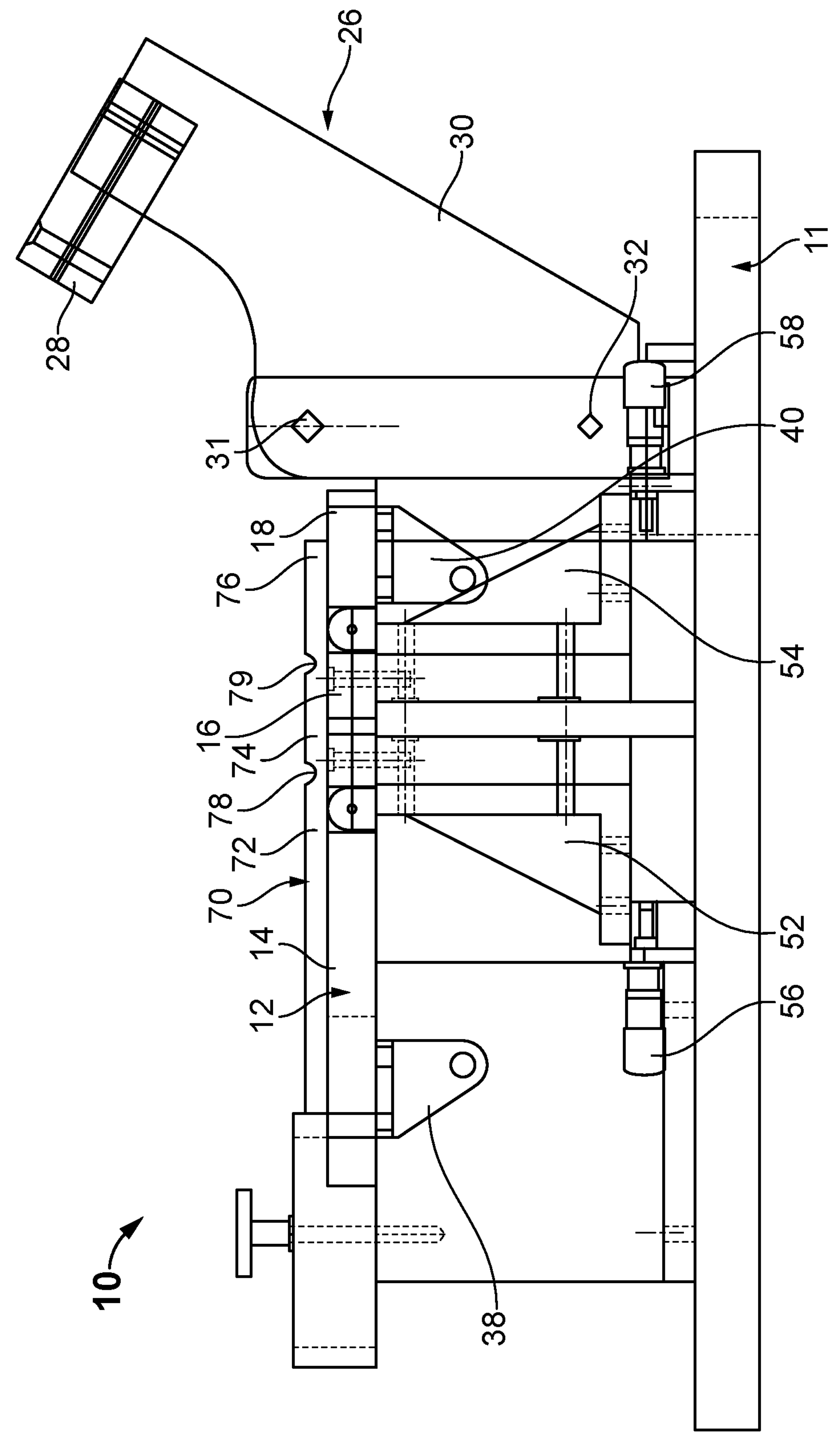
FIG. 5 is a side schematic view of an embodiment of a device for forming laminate flooring into a square-nose configuration performing a step of a formation process in accordance with the present disclosure.
Figure 6:
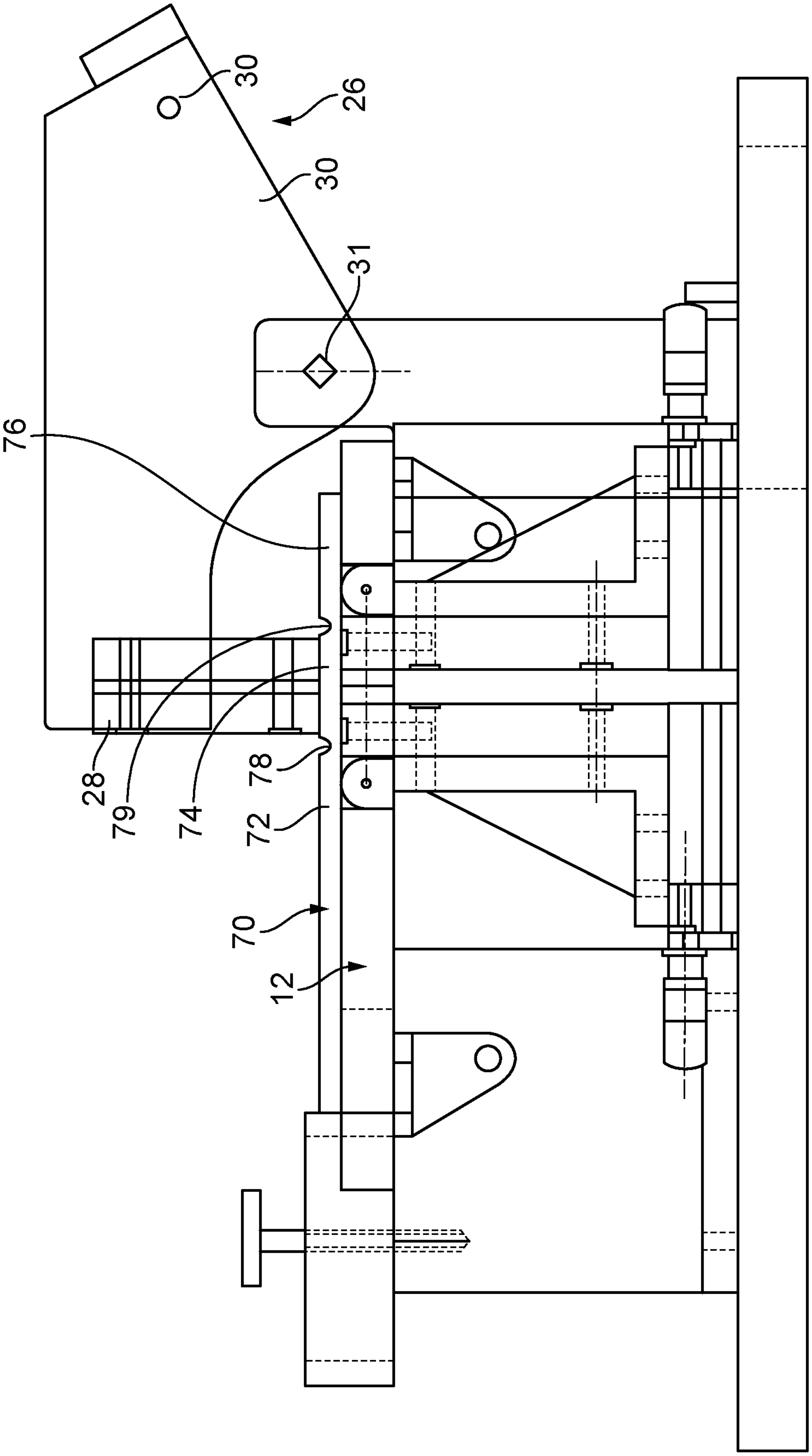
FIG. 6 is a side schematic view of an embodiment of a device for forming laminate flooring into a square-nose configuration performing a step of a formation process in accordance with the present disclosure.
Figure 7:
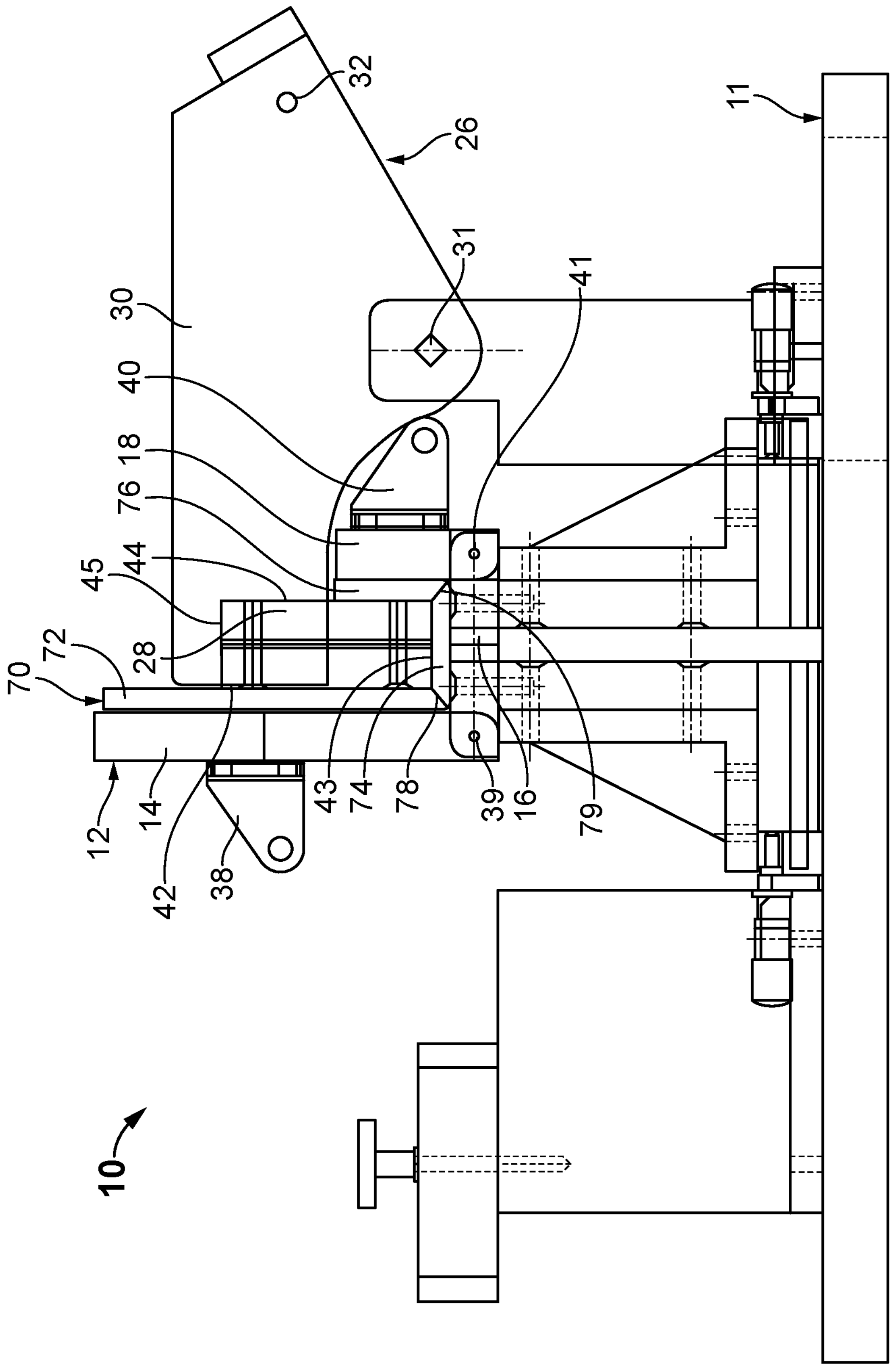
FIG. 7 is a side schematic view of an embodiment of a device for forming laminate flooring into a square-nose configuration performing a step of a formation process in accordance with the present disclosure.

Referring generally to FIGS. 5-7, a processing of operating the square-nose device 10 to form the flooring 70 into a square-nose configuration is shown, according to some embodiments of the present disclosure. The process may include a first step of placing the flooring 70 on the forming panel 12, a second step of securing the second section 74 of the flooring 70 to the second forming plate 16, and a third step of forming the flooring 70 into a square-nose configuration.

Referring now to FIG. 5, the flooring 70 is shown placed on the forming panel 12 in the first step, as mentioned above and depicted with reference to FIG. 3. As mentioned above, the flooring 70 may be placed on the forming panel 12 such that the first section 72 is aligned with the first forming plate 14, the second section 74 is aligned with the second forming plate 16, and the third section 76 is aligned with the third forming plate 18. In some embodiments, the second forming plate 16 may be configurable to accommodate a variety of widths associated with the second section 74 of the flooring 70 in order to accommodate such alignment in accordance with a variety of desired dimensions for square-nosed configurations of the flooring 70. For example, the second forming plate 16 may include a first base 52 and a second base 54 extending downward from therefrom. The first base 52 and the second base 54 are adapted to move closer or further apart from the top ends of one another in order to provide a shorter or longer width for the second forming plate 16. Such adjustments may be accomplished via a first mechanical adjuster 56 and a second mechanical adjuster 58. The mechanical adjusters 56,58 can move away from each other to lengthen the width of the second forming plate 16 and the mechanical adjusters 56,58 can be moved closer to each other to shorten the width of the second forming plate 16.

Referring now to FIG. 6, the first clamp bar 28 is shown securing the second section 74 of the flooring 70 to the second forming plate 16 of the forming panel 12 in a second step, as mentioned above and depicted with reference to FIG. 4. For example, and as mentioned above, the various swing arms 30 (and, therefore, the first clamp bar 28) may be configured to rotate about the pivot bar 31 in order to rotate the position of the first clamp bar 28. Thus, using the pivot bar 31, the first clamp bar 28 is moved into position for securing the second section 74 to the second forming plate 16. In particular, and as shown in FIG. 7, the first clamp bar 28 may have three open sides 42,43,44 and a fourth side 45 being engaged with the swing bars 30. A first side 43 of the first clamp bar 28 may be engaged with the second section 74 in order to secure the second section 74 to the second forming plate 16.

Referring now to FIG. 7, the first forming plate 14 and the third forming plate 18 are shown rotated with respect to the second forming plate 16, thereby forming the flooring 70 into a square-nose configuration in a third step, as mentioned above. For example, the first side 43 of the first clamp bar 28 may secure the second section 74 to the second forming plate 16 as discussed above in the second step. Then, the first forming plate 14 may be rotated relative to the second forming plate 16 (about the first plate joint 39) such that the first section 72 of the flooring 70 is secured to a second side (42) of the first clamp bar 28, thereby forming a right angle between the first section 72 and the second section 74 along the first groove 78. Similarly, the third forming plate 18 may be rotated relative to the second forming plate 16 (about the second plate joint 41) such that the third section 76 of the flooring 70 is secured to a third side 44 of the first clamp bar 28, thereby forming a right angle between the third section 76 and the second section 74 along the second groove 79. Thus, the flooring 70 may be configured in a square-nose configuration.

Figure 8:
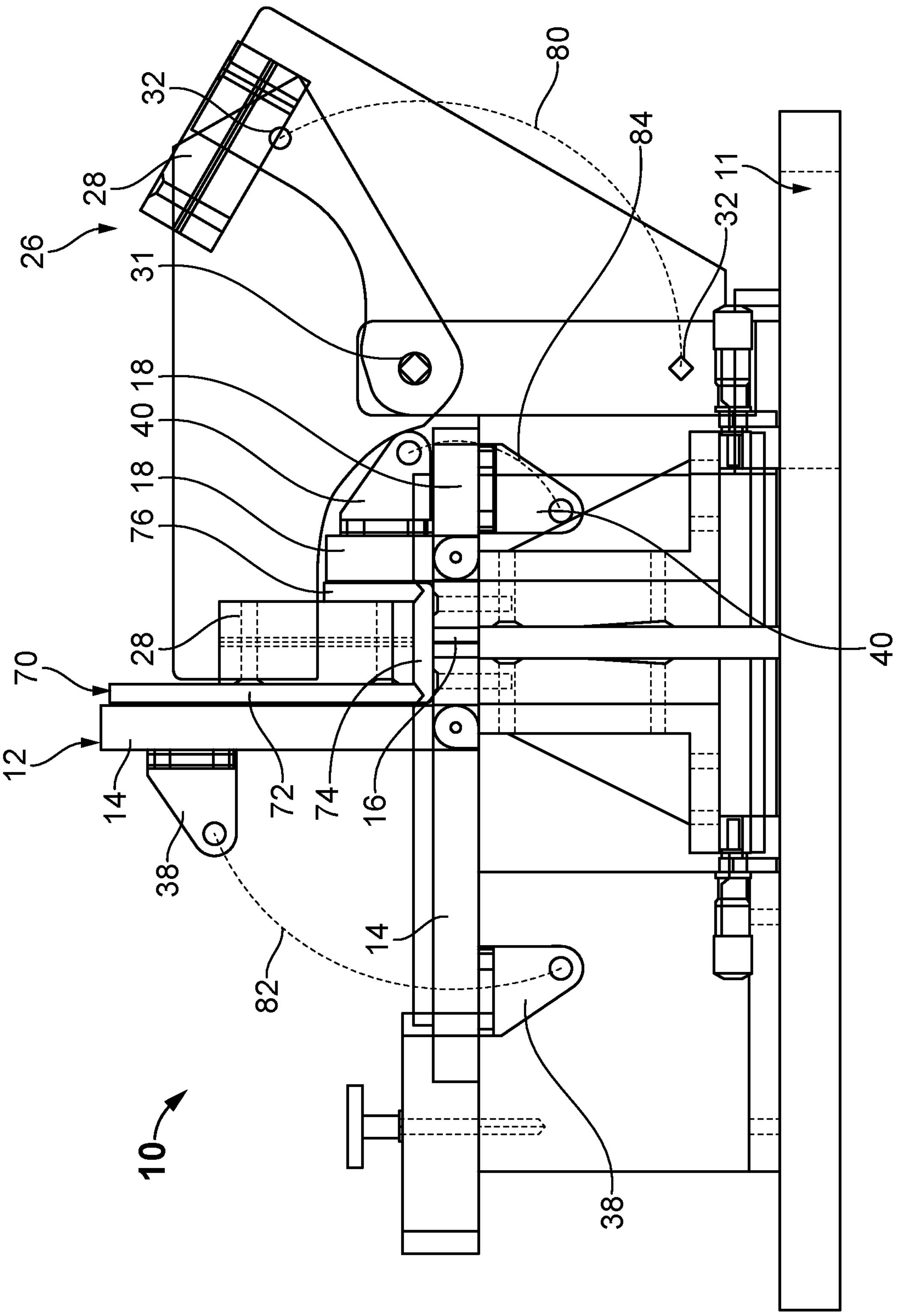
FIG. 8 is a side schematic view of an embodiment of a device for forming laminate flooring into a square-nose configuration performing various steps of a formation process in accordance with the present disclosure.
Figure 9:
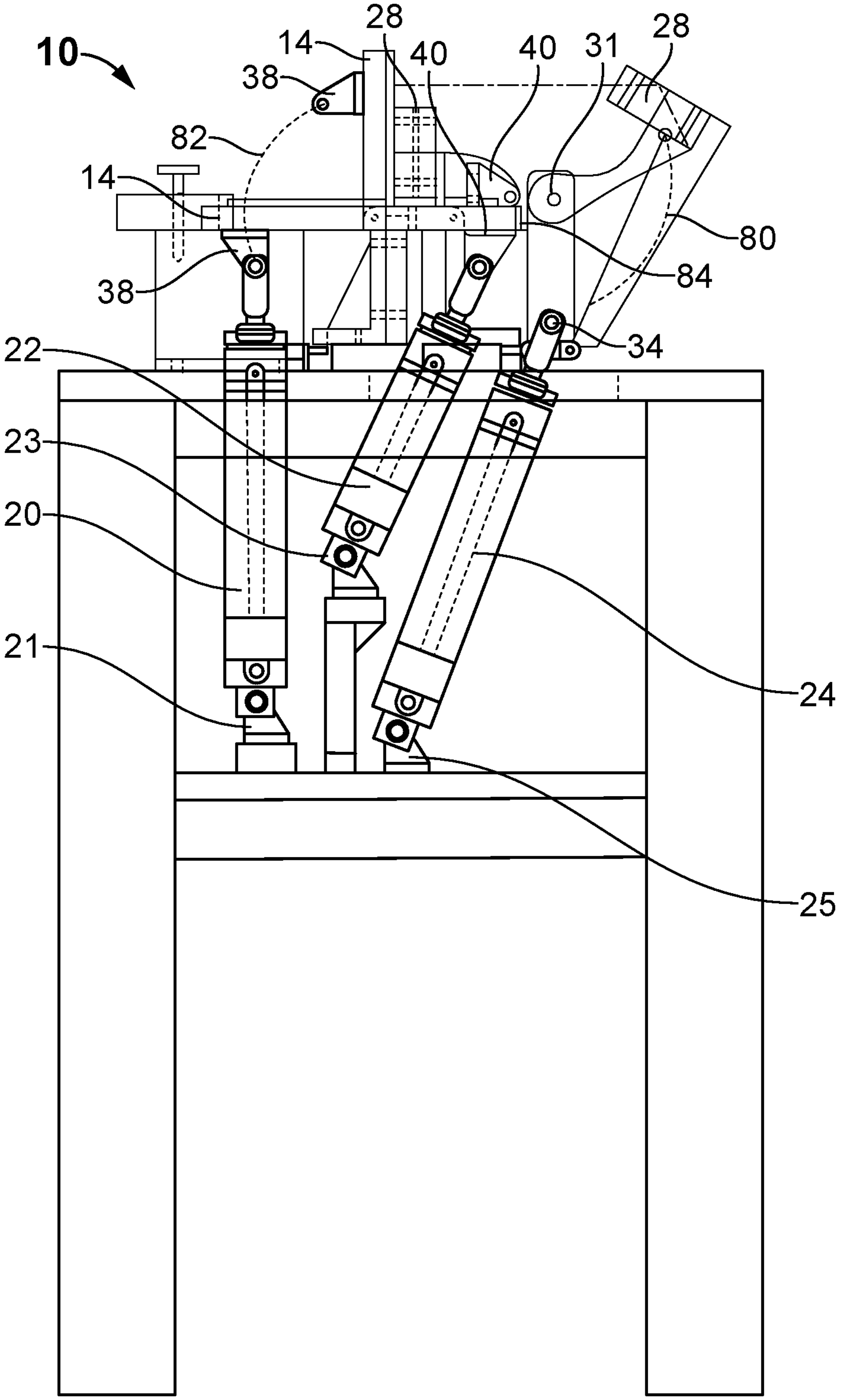
FIG. 9 is a side schematic view of an embodiment of a device for forming laminate flooring into a square-nose configuration performing various steps of a formation process in accordance with the present disclosure.

Referring now to FIGS. 8-9, the various paths of movement for components of the square-nose device 10 are shown in accordance with the steps discussed above with reference to FIGS. 5-7. As a first example, the first clamp bar 28 (via the swing arms 30) may be rotated about the pivot bar 31 (via the third actuator(s) 24 and the third pivot(s) 34 engaging the actuator bar 32) along a first path of curvature 80 in accordance with the first step depicted with reference to FIG. 6. Thus, the second section 74 of the flooring 70 may be secured to the second forming plate 16. As a second example, the first forming plate 14 may be rotated about the first plate joint 39 (via the first actuator(s) 20 and the first pivot(s) 38) along a second path of curvature 82 in the third step depicted with reference to FIG. 7. Thus, the first section 72 of the flooring 70 may form a right angle with the second section 74. As a third example, the third forming plate 18 may be rotated about the second plate joint 41 (via the second actuator(s) 22 and the second pivot(s) 40) along a third path of curvature 84 in the third step depicted with reference to FIG. 7. Thus, the third section 76 of the flooring 70 may form a right angle with the second section 74. With reference to FIG. 9, in order to facilitate the various movements of the first, second, and third actuator(s) 20, 22, 24 relative to the first frame 11, each of the first, second, and third actuator(s) 20, 22, 24 may be rotatably coupled to the first frame 11 via fourth pivot(s) 21, fifth pivot(s) 23, and sixth pivot(s) 25.

Figure 10:
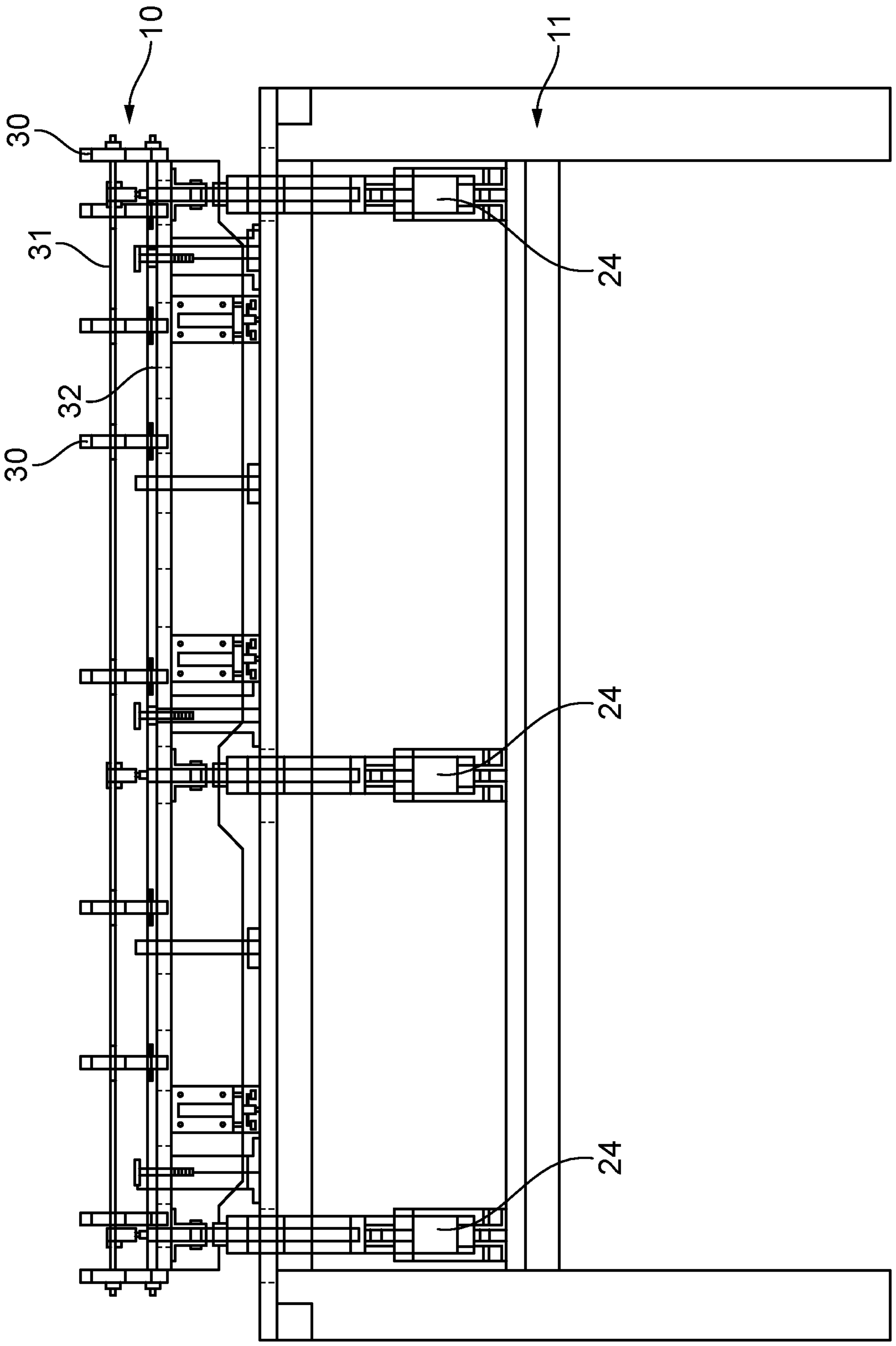
FIG. 10 is a rear schematic view of an embodiment of a device for forming laminate flooring into a square-nose configuration in accordance with the present disclosure.

Referring now to FIG. 10, a length-wise view of the square-nose device 10 is shown, according to some embodiments of the present disclosure. As mentioned above, the square-nose device 10 may include a number of first, second, and third actuator(s) 20, 22, 24. As illustrated, three third actuators 24 are included and depending on the size of the square-nose device 10, the number of actuators can vary. Referring to FIGS. 1-4 and 10, the third actuator(s) 24 may be rotatably coupled at actuable end(s) thereon to third pivot member(s) 34 on the swing arms 30 via third pivot member(s) 34 coupled to an actuator bar 32 rotatably coupled to each of the swing arms 30.

Figure 11:
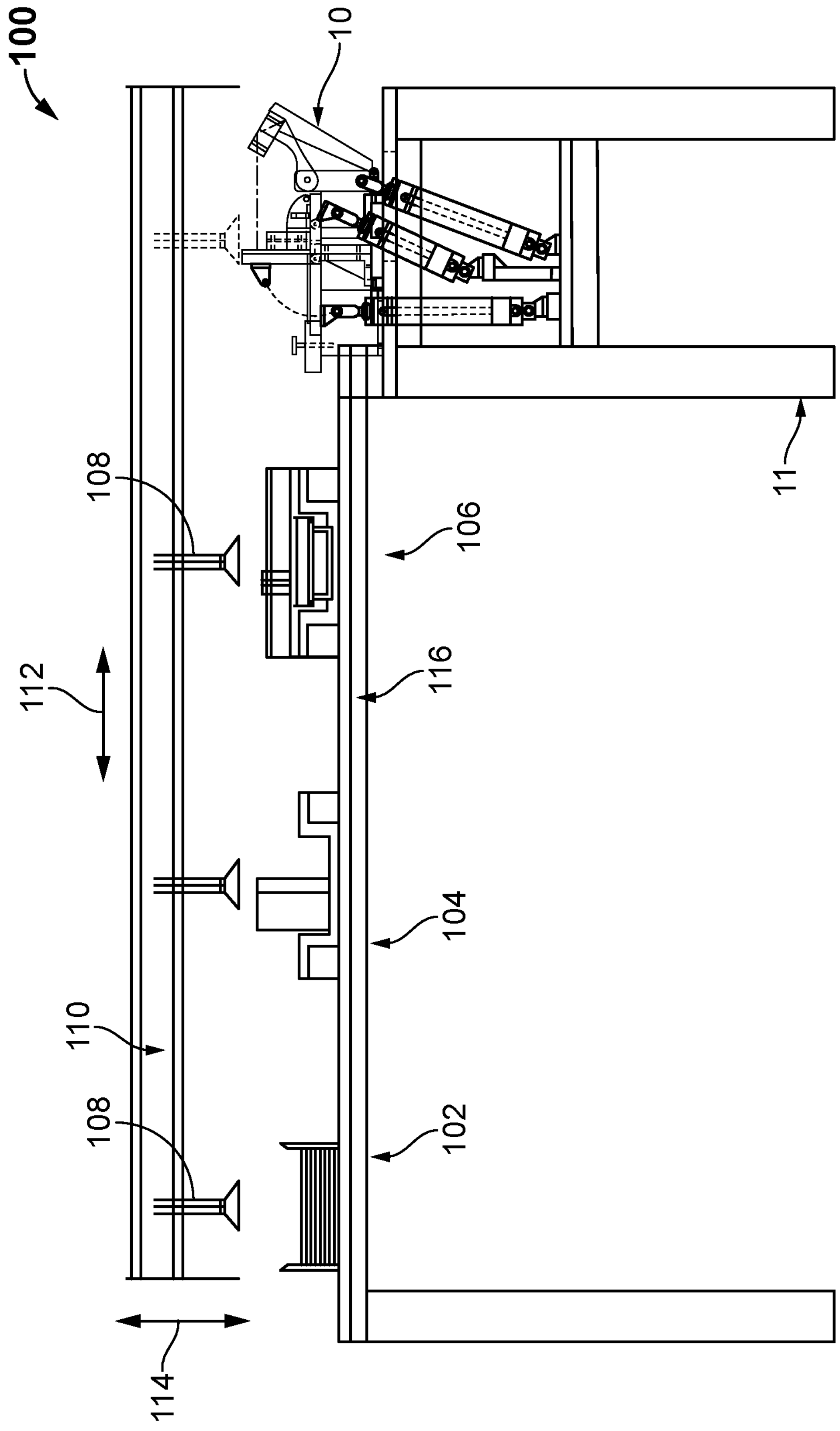
FIG. 11 is a side schematic view of an embodiment of an automated system for forming laminate flooring into a square-nose configuration in accordance with the present disclosure.

Referring now to FIG. 11, the automated square-nose system 100 for forming the flooring 70 into a square-nosed configuration is shown, according to some embodiments of the present disclosure. The automated square-nose system 100 may include the square-nose device 10 as discussed above. Further, the automated square-nose system 100 may include a first de-stacker 102, a router station 104, and a heater/glue station 106. One or more of the first de-stacker 102, router station 104, and the heater-glue station 106 may be secured in place relative to one another via a second frame 116, which may be operatively secured to the first frame 11 of the square-nose device 10. In the preferred embodiment, the automated square-nose system 100 of the present embodiment can facilitate a four-step process for automatically forming the flooring 70 into a square-nose configuration.

For example, in a first step, a first movement arm 108 which can be in the form of one of suction cup, mechanical hand, magnet, and more retrieves the flooring 70 from a stack of flooring by vertical movement of the first movement arm 108 (in the direction 114). The first movement arm 108 is also adapted to move in lateral direction 112 in order to move the flooring 70 to the router station 104, which may cut the first and second grooves 78, 79 into the surface of the flooring 70 in a second step. The repeated movements of the first movement arm 108 in the direction 114, as well as the direction 112 may be facilitated by a third frame 110 secured above the second frame 116. The first movement arm 108 is operatively connected to the third frame 110 and helps in smooth movement of the first movement arm 108. The first movement arm 108 may then move the flooring 70 to the heater/glue station 106, which may apply an adhesive to the first and second grooves 78, 79, as well as heat the flooring 70, thereby preparing the flooring 70 to be formed into the square-nose configuration in a third step. The first movement arm 108 may then move the flooring 70 to the square-nose device 10, which may operate as discussed above in a fourth step. The movement of the first, second, and third sections 72, 74, 76 relative to one another may be facilitated by the heated temperature of the flooring 70 (via the heater/glue station 106), thereby making the flooring 70 more pliable. When the flooring 70 is formed by the square-nose device 10 into the square-nose configuration, the adhesive applied to the first and second grooves 78, 79 at the heater/glue station 106 may solidify in order for the flooring 70 to cool and solidify into the square-nose configuration formed by the square-nose device 10. Further, when the flooring 70 cools down from its heated temperature (provided by the heater/glue station 106), the flooring 70 may become rigidly set in the square-nose configuration formed via the square-nose device 10.

Figure 12:
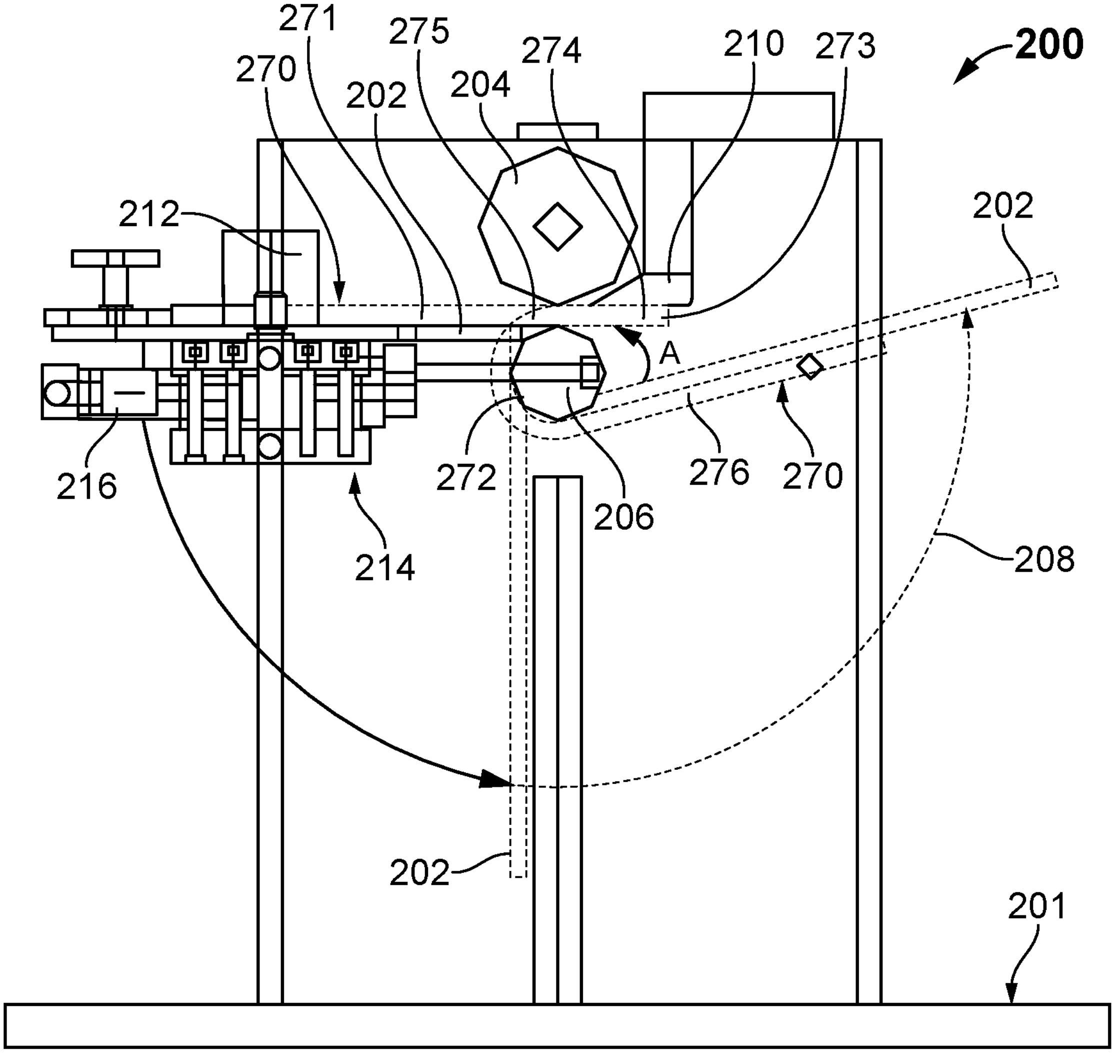
FIG. 12 is a side schematic view of an embodiment of a device for forming laminate flooring into a bull-nose configuration performing a step of a formation process in accordance with the present disclosure.

Referring now to FIG. 12, an exemplary implementation of the bull-nose device 200 is shown, according to some embodiments of the present disclosure. Various components of the bull-nose device 200 may be secured to a fourth frame 201. As discussed in greater detail below, the bull-nose device 200 may be configured to receive the flooring 270 and secure the flooring 270 to a rotor plate 202, such that the flooring 270 is positioned in between a first roller 204 and a second roller 206. When the flooring 270 is positioned as such, a portion 271 of the flooring 270 is secured to the rotor plate 202, while another portion 273 of the flooring 270 is free of (e.g., not secured to) the rotor plate 202. In some embodiments, this is facilitated by feeding the flooring 270 onto the rotor plate 202 and in between the first and second rollers 204, 206 until the flooring 270 reaches a retainer 210, thereby stopping the flooring 270 in position for formation via the bull-nose device 200. Once stopped by the retainer 210, the flooring 270 may be secured to the rotor plate 202 via a clamp bar 212. The retainer 210 along with the clamp bar 212 secure the flooring 270 at a substantially planar position relative to the rotor plate 202.

In order to bend the flooring 270 to transform the flooring 270 into a bull-nose configuration, the flooring 270 may then be rotated using the bull-nose device 200. In the present embodiment of the disclosure, the first roller 204 and the second roller 206 retain their respective positions during such rotation. The first and the second roller 204,206 are adapted to hold one end 275 of the free portion 273 of the flooring 270 therebetween. Preferably, the first roller 204 is positioned above the free portion 273 of the flooring 270 and the second roller 206 is positioned below the free portion of the flooring 270. Simultaneously, the rotor plate 202, with the flooring 270 secured thereto, may be rotated relative to the second roller 206. During the rotation of the rotor plate 202, the second roller 206 may rotate (for example, in the direction "A") in order to facilitate the retention of the portion of the flooring 270 positioned between the first and second rollers 204, 206 against the surfaces of the first and second rollers 204, 206. In some embodiments, the first roller 204 also rotates in order to facilitate such retention. The rotation of the rotor plate 202, which may follow a path of curvature 208, facilitates the formation a curved portion of 272 and a first straight portion 274 on the flooring 270 on the free portion of the flooring 270. Simultaneously, the remaining portion of the flooring 270 (e.g., the portion 271 of the flooring 270 secured to the rotor plate 202), remains straight as initially provided to the bull-nose device 200, thus providing a second straight portion 276 of the flooring 270. Thus, the flooring 270 may be formed into a bull-nose configuration.

Figure 13:
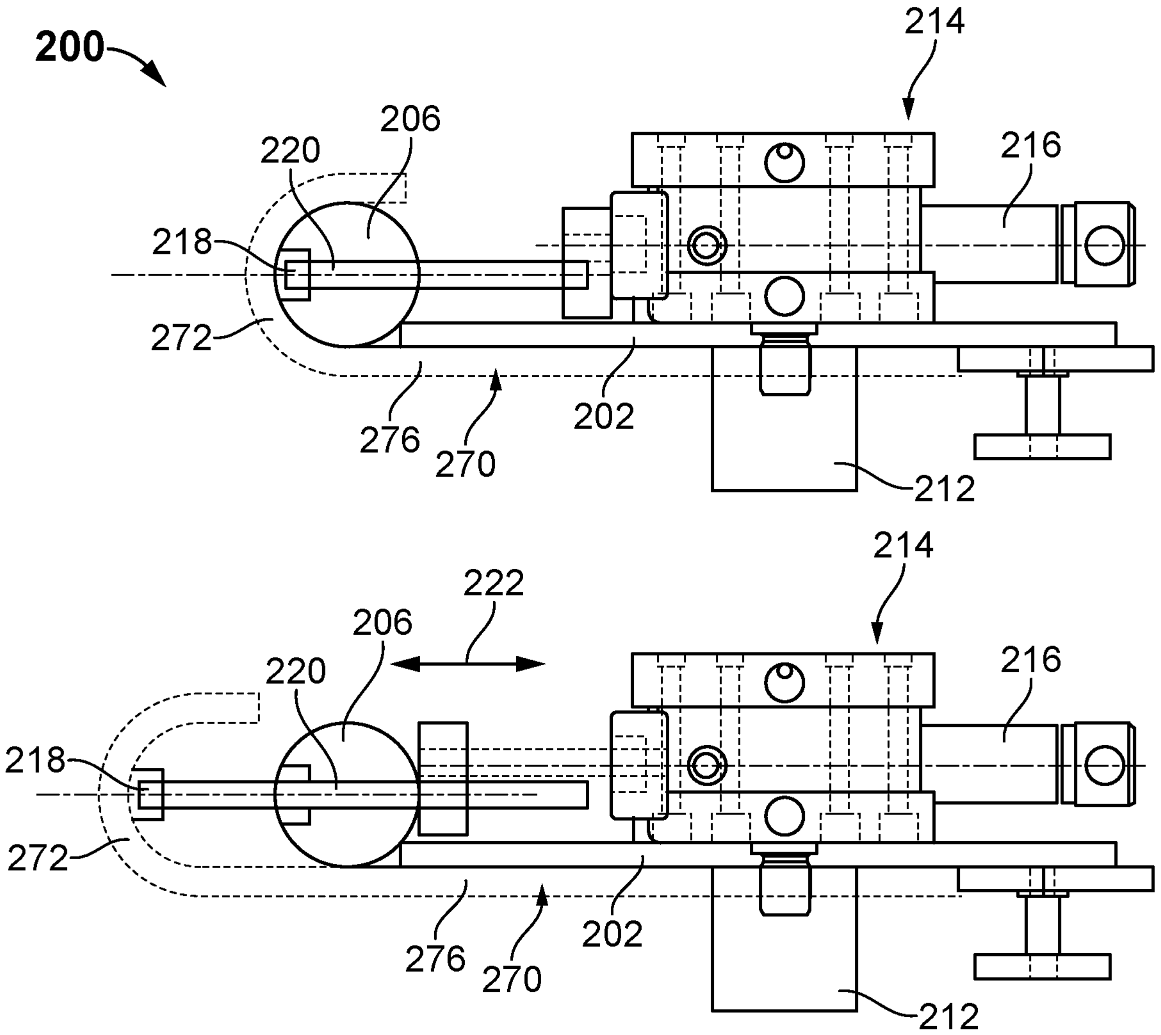
FIG. 13 is a side schematic view of an embodiment of a device for forming laminate flooring into a bull-nose configuration performing a step of a formation process in accordance with the present disclosure.

Referring now to FIG. 13, once the flooring 270 is formed into a bull-nose configuration as discussed above, an ejector device 214 may be operable to discharge the flooring 270 from the bull-nose device 200. The ejector device 214 may include an actuable end 218 which may be extended via an actuator 216. The actuable end 218 may be disposed within an aperture (e.g., keyway) 220 extending through the second roller 206. The ejector device 214 may be secured to the rotor plate 202, such that the ejector device 214 retains its position relative to the flooring 270 throughout rotation of the rotor plate 202. As mentioned above, the second roller 206 may rotate while the rotor plate 202 is rotating. The rotation of the second roller 206 may occur at a pace that matches the rotation of the ejector device 214, thereby allowing the actuable end 218 of the ejector device 214 to consistently remain within the aperture 220.

Once the rotation of the rotor plate 202 (e.g., along the path of curvature 208) and the formation of the flooring 270 into a bull-nose configuration is complete, the clamp bar 212 may be configured to release the flooring 270 from the rotor plate 202. Simultaneously, the actuable end 218 may be extended via the actuator 216, such that the actuable end 218 extends out of the aperture 220 (e.g., in a direction 222) of the second roller 206 and against the curved portion 272 of the flooring 270, thereby discharging the flooring 270 from the bull-nose device 200. Once the flooring 270 has been discharged from the bull-nose device 200, the actuable end 218 may retreat within the aperture 220 (e.g., in the direction 222) and the rotor plate 202 may be rotated back to its initial position, such that the rotor plate 202 is ready to receive another piece of flooring 270 (via the clamp bar 212) for forming the flooring 270 into a bull-nose configuration.

Figure 14:
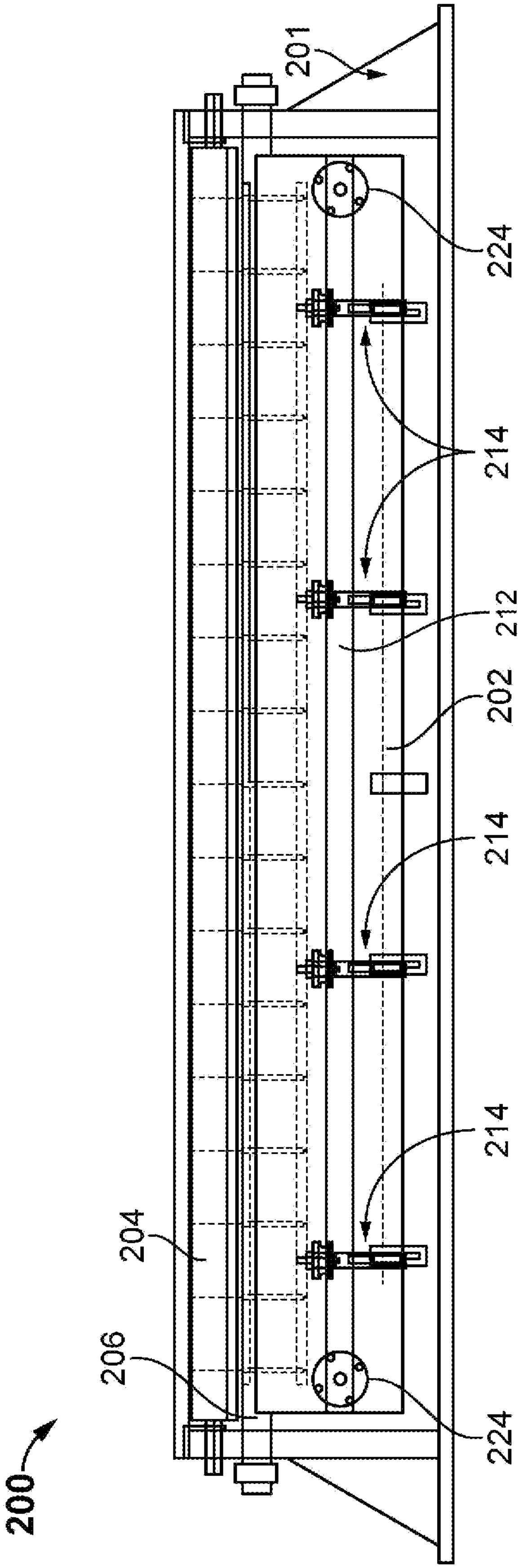
FIG. 14 is a rear schematic view of an embodiment of a device for forming laminate flooring into a bull-nose configuration in accordance with the present disclosure.

Referring now to FIG. 14, a rear view of the bull-nose device 200 is shown, according to some embodiments of the present disclosure. As shown, multiple ejector devices 214 may be used for discharging the flooring 270 from the bull-nose device 200. In some embodiments, multiple ejector device 214 may be secured to, and rotate with, a single rotor plate 202 as mentioned above. In some embodiments, such rotation is generated using the clamp bar 212, which is secured to the rotor plate 202 to facilitate one or more actuators 224.

Figure 15:
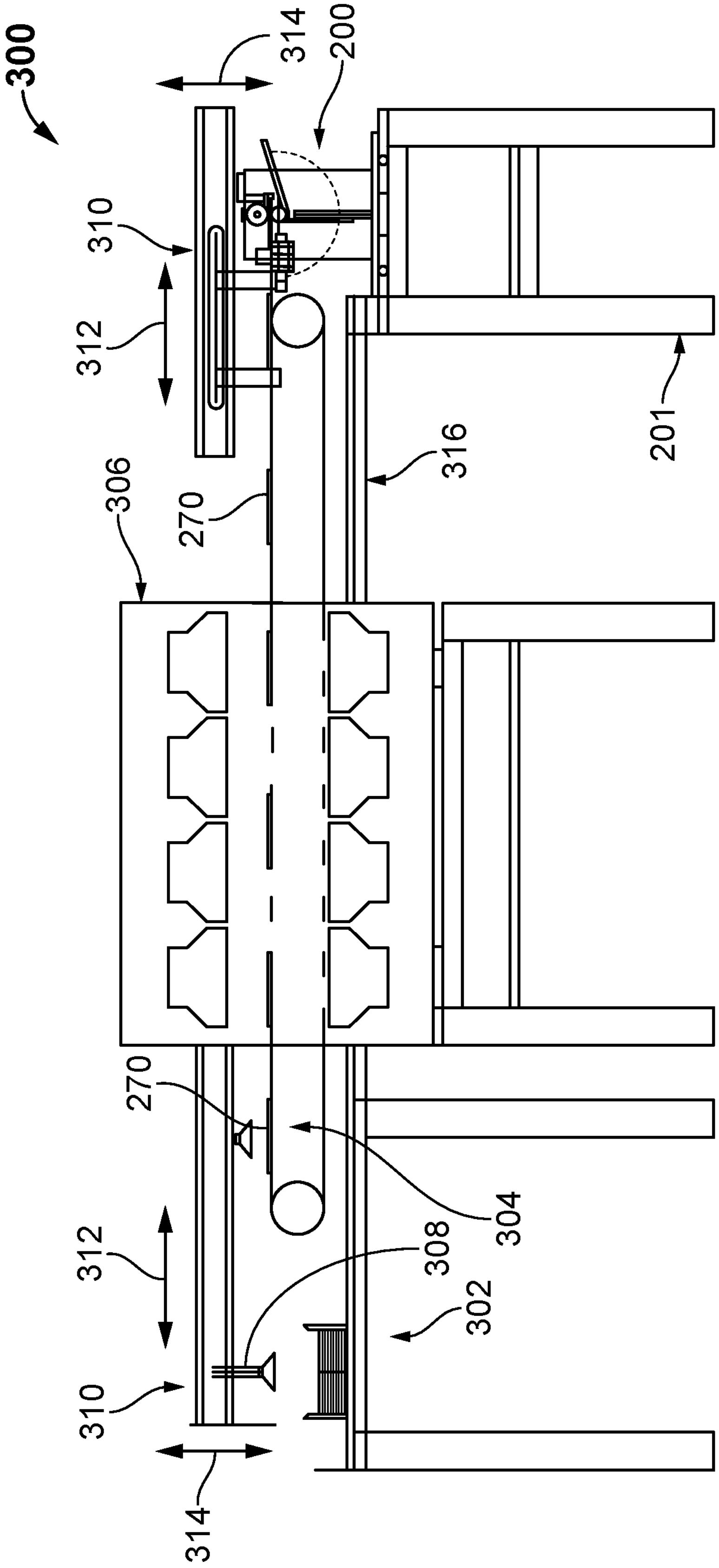
FIG. 15 is a side schematic view of an embodiment of an automated system for forming laminate flooring into a bull-nose configuration in accordance with the present disclosure.

Referring now to FIG. 15, the automated bull-nose system 300 for forming the flooring 270 into a bull-nosed configuration is shown, according to some embodiments of the present disclosure. The automated bull-nose system 300 may include the bull-nose device 200 as discussed above. Further, the automated bull-nose system 300 may include a de-stacker 302, a conveyer system (e.g., a conveyer belt) 304, and a heater oven 306. One or more of the de-stacker 302, conveyer system 304, and the heater oven 306 may be secured in place relative to one another via a fifth frame 316, which may be secured to the fourth frame 201 of the bull-nose device 200. Depending on the implementation, the automated bull-nose system 300 may thus facilitate a three-step process for forming the flooring 270 into a bull-nose configuration.

For example, in a first step, a second movement arm 308 may retrieve the flooring 270 from a stack of flooring (by moving up and down in the direction 314). The second movement arm 308 may move forward and backward in a direction 312 in order to move the flooring 270 to the conveyer system 304, which may move receive and move the flooring 270 through the heater oven 306, which may heat the flooring 270 in a second step, thereby preparing the flooring 270 to be formed into the bull-nose configuration in a third step. The conveyer system 304 may move the flooring 270 to the bull-nose device 200, which may operate as discussed above. The bending of the flooring 270 into the first straight portion 274, curved portion 272, and second straight portion 276 may be facilitated by the heated temperature of the flooring 270 (via the heating oven 306), thereby making the flooring 270 more pliable. When the flooring 270 cools down from its heated temperature (provided by the heating oven 306), the flooring 270 may become rigidly set in the bull-nose configuration formed via the bull-nose device 200. Once the flooring 270 is formed into the bull-nosed configuration as discussed above, the flooring 270 may be discharged from the bull-nose device 200 (and, thus, the automated bull-nose system 300).

Figure 16:
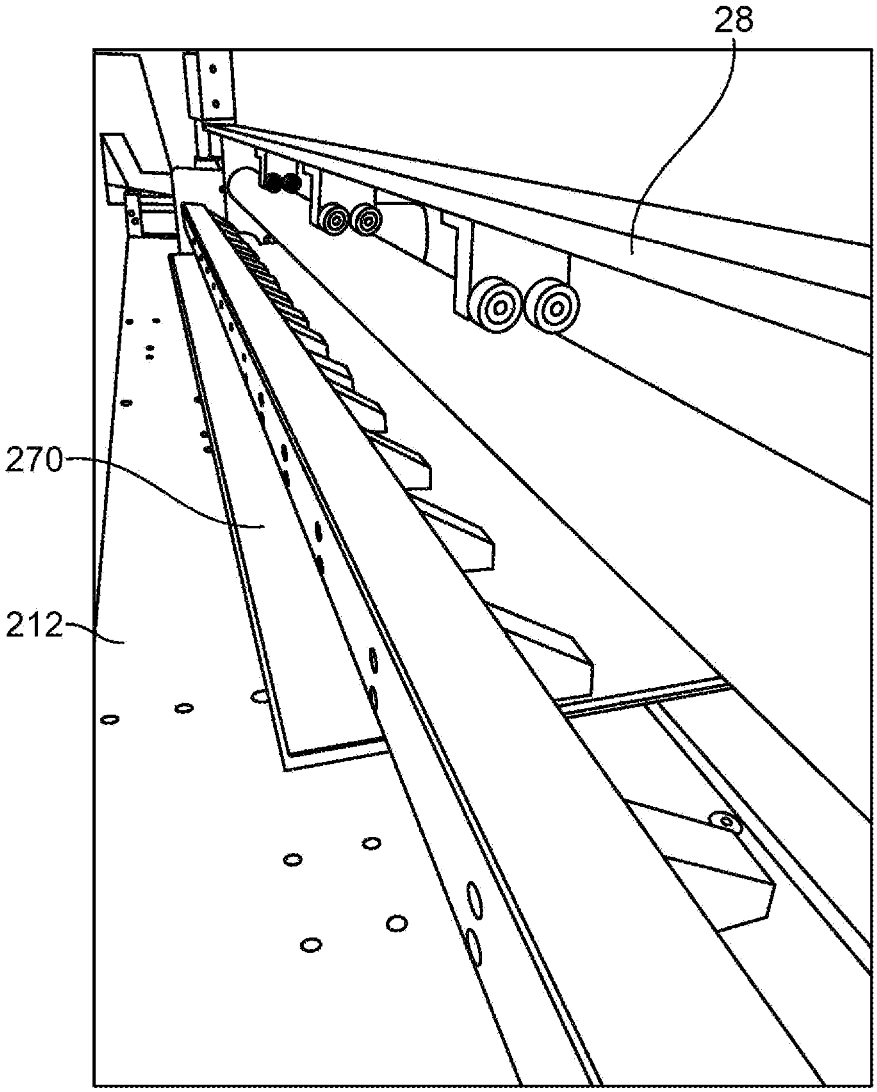
FIG. 16 is a close view of an embodiment for forming laminate flooring into a bull-nose configuration in accordance with the present disclosure.

Referring now to FIG. 16, the flooring 270 is placed on the rotor plate 212 of the bull-nose device 200. The clamp bar 212 supports and secures the flooring 270 to help in bending the flooring 270 as described earlier in the disclosure.

Figure 17:
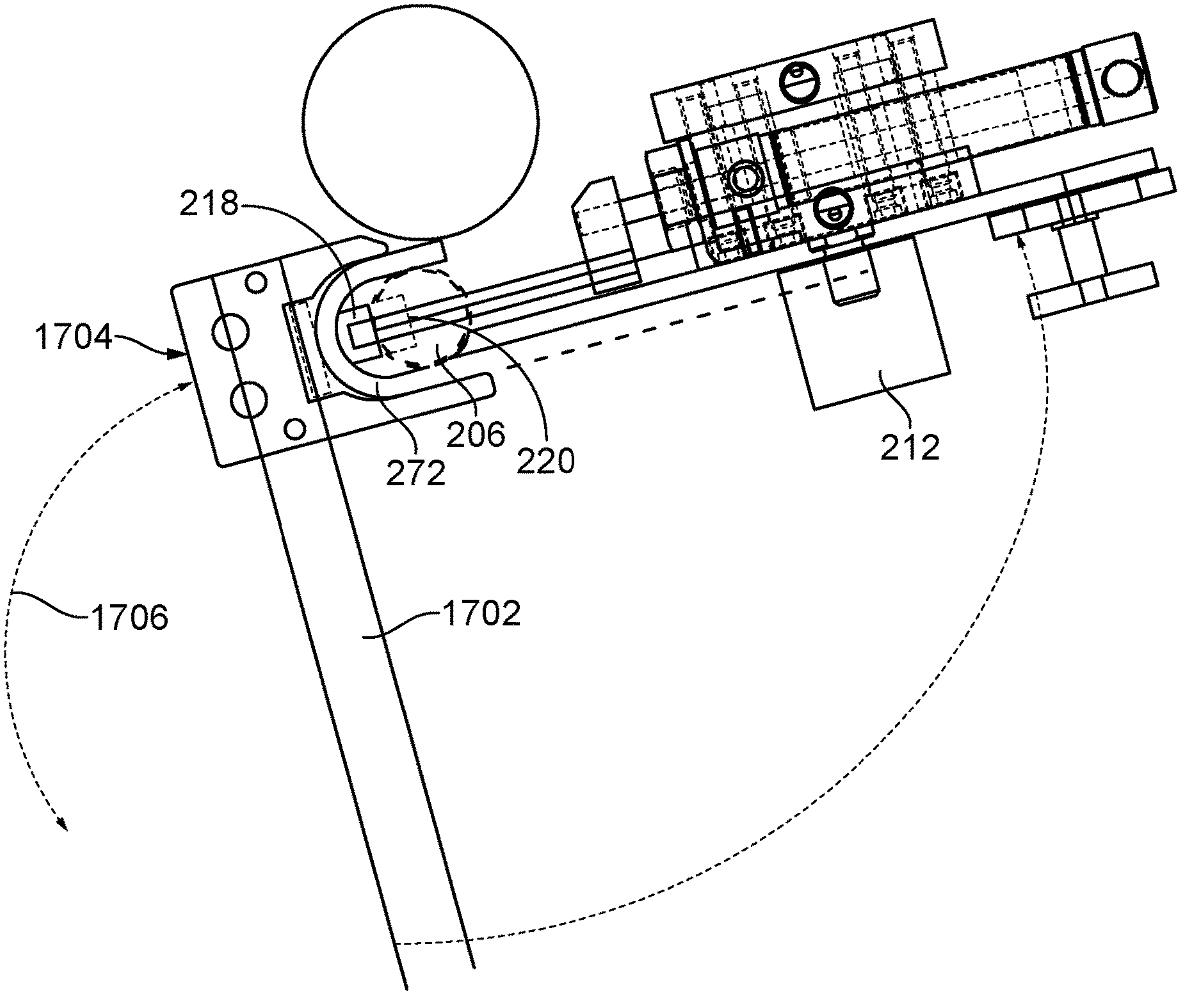
FIGS. 17 and 18 are side schematic views of an embodiment for forming laminate flooring into a bull-nose configuration in accordance with the present disclosure.
Figure 18:
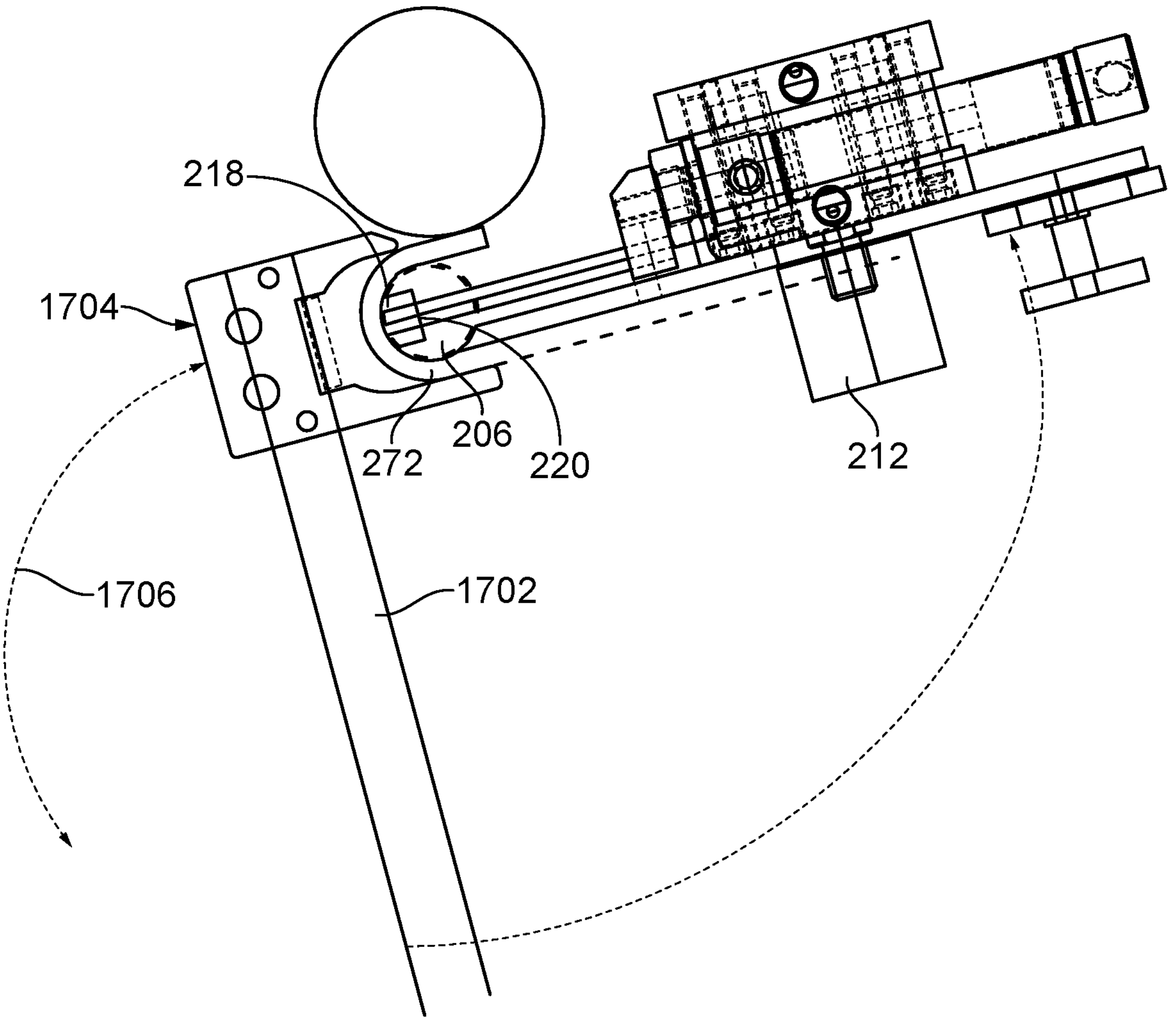

Referring now to FIGS. 17 and 18 for the bull-nose device 200, the swing arm 1702, 1704, having an adjustable bow plate to remove any bow created by the second roller 206 is rotated into place through the direction of 1706 and secured against the second roller 206. Clamp bar 212 is released, aperture 220 extends into the swing arm 1702, 1704 and secures the flooring 270 against the 1704 adjustable bow plate during first phase of release. During second phase of release, swing bars 1702, 1704 rotate down out of the way in the direction of 1706 and allows the completion of removal of flooring 270 via aperture 220. The actuable end 218 retreats within the aperture 220 as described in FIG. 13 as well.

Thus, although there have been described particular embodiments of the present invention of a new and useful DEVICE AND METHODS FOR FOLDING AND BENDING LAMINATE FLOORING, it is not intended that such references to particular embodiments be construed as limitations upon the scope of this invention.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

While several embodiments of the invention have been described, it should be apparent, however, that various modifications, alterations and adaptations to those embodiments may occur to persons skilled in the art with the attainment of some or all of the advantages of the invention. For example, according to various embodiments, a single component may be replaced by multiple components, and multiple components may be replaced by a single component, to perform a given function or functions. This application is therefore intended to cover all such modifications, alterations and adaptations without departing from the scope and spirit of the disclosed invention as defined by the appended claims.

What is claimed is:

1. A device for forming bull-nose flooring, the device comprising:

a frame;

a first roller disposed on the frame;

a second roller disposed on the frame, the second roller including a rotor plate and an aperture extending through the roller;

said aperture dividing said roller;

a pressure source;

a rotor plate disposed on the second roller, the rotor plate configured to receive a piece of flooring, the piece of flooring is positioned in between the first and second rollers;

a clamp bar configured to secure the piece of flooring to the rotor plate;

an actuator configured to rotate the rotor plate and second roller relative to the first roller, wherein rotation of the rotor plate and second roller forms a curved portion, a first straight portion and a second straight portion in the flooring;

a second clamp bar attached to a swing arm and containing an adjustable bow plate;

said pressure source communicating with said aperture such that when said pressure source is activated, the piece of flooring that has been formed ejects into the second clamp bar or from the device without causing damage to the said piece of flooring.

2. The device of claim 1, wherein the first roller is positioned above the flooring and the second roller is positioned below the flooring, when the flooring is disposed on the rotor plate.

3. The device of claim 1, further comprising a retainer configured to stop the flooring in position for formation via the bull-nose device.

4. The device of claim 1, including an ejector device.

5. The device of claim 4, wherein the ejector device includes an actuable end disposed within an aperture extending through the second roller, the actuable end extendable to push the flooring into the clamp bar and/or discharge the flooring from the bull-nose device.

6. The device of claim 5, wherein the actuable end is retreated within the aperture on discharge of the flooring from the bull-nose device.

* * * * *